United States Patent
Hashimoto et al.

(10) Patent No.: US 8,609,227 B2
(45) Date of Patent: Dec. 17, 2013

(54) MULTILAYER POLYESTER FILM

(75) Inventors: Kokichi Hashimoto, Shiga (JP); Masahiro Kimura, Shiga (JP); Hiroshi Shinnumadate, Shiga (JP); Hirokado Nakamura, Shiga (JP)

(73) Assignee: Toray Industries, Inc. (JP)

( * ) Notice: Subject to any disclaimer, the term of this patent is extended or adjusted under 35 U.S.C. 154(b) by 584 days.

(21) Appl. No.: 12/743,261

(22) PCT Filed: Dec. 9, 2008

(86) PCT No.: PCT/JP2008/072286
§ 371 (c)(1),
(2), (4) Date: May 17, 2010

(87) PCT Pub. No.: WO2009/078304
PCT Pub. Date: Jun. 25, 2009

(65) Prior Publication Data
US 2010/0272974 A1  Oct. 28, 2010

(30) Foreign Application Priority Data

Dec. 14, 2007 (JP) ................................. 2007-322992

(51) Int. Cl.
*B32B 7/02* (2006.01)
(52) U.S. Cl.
USPC ............................. 428/212; 428/220; 428/480
(58) Field of Classification Search
USPC ................................ 428/212, 220, 480, 411.1
See application file for complete search history.

(56) References Cited

U.S. PATENT DOCUMENTS 3,567,693 A * 3/1971 Piirma .......................... 528/275

FOREIGN PATENT DOCUMENTS

| JP | 6-210799 A | 8/1994 |
| JP | 6-255058 A | 9/1994 |
| JP | 6-255059 A | 9/1994 |
| JP | 7-246688 A | 9/1995 |
| JP | 8-025597 A | 1/1996 |
| JP | 3090911 B2 | 9/2000 |
| JP | 2000-344909 A | 12/2000 |
| JP | 3139512 B2 | 3/2001 |
| JP | 2002-097261 A | 4/2002 |
| JP | 2008-143024 A | 6/2008 |
| JP | 2008-221559 A | 9/2008 |

OTHER PUBLICATIONS

Kimura et al (JP 06-255059 machine translation), Sep. 13, 1994.*

* cited by examiner

*Primary Examiner* — Mark Ruthkosky
*Assistant Examiner* — Lawrence Ferguson
(74) *Attorney, Agent, or Firm* — DLA Piper LLP (US)

(57) ABSTRACT

A multilayer polyester film is characterized in that a polyester (B) layer mainly composed of a polyester (B) is arranged on at least one side of a polyester (A) layer mainly composed of a polyester (A). The multilayer polyester film is also characterized by having an elastic modulus of 20 to 1000 MPa in an atmosphere at 23° C. and an elastic modulus of 10 to 200 MPa in an atmosphere at 120° C., and having substantially no-orientation.

15 Claims, No Drawings

MULTILAYER POLYESTER FILM

RELATED APPLICATIONS

This is a §371 of International Application No. PCT/JP2008/072286, with an international filing date of Dec. 9, 2008 (WO 2009/078304 A1, published Jun. 25, 2009), which is based on Japanese Patent Application No. 2007-322992, filed Dec. 14, 2007, the subject matter of which is incorporated by reference.

TECHNICAL FIELD

This disclosure relates to a multilayer polyester film excellent in flexibility, heat resistance, solvent resistance, printability, formability and embrittlement resistance over time.

BACKGROUND

Biaxially oriented polyester films have been conventionally used as a forming film for use in molding a transfer foil (for example, see Japanese Patent Application Laid-Open Nos. 6-210799 and 2000-344909), but formability for transferring the foil to a material having a large drawing ratio or a complicated shape is insufficient when the biaxially oriented polyester films are used in forming use, e.g., for use as transfer foils.

In addition, as a polyester film for the improvement of formability, a transfer foil using a copolymerized polyester film with a lower forming stress compared with a biaxially oriented polyester film (for example, see Japanese Patent No. 3090911) and a polyester film directed for use in formed, processed, and printed products, containing a specific glycol component (e.g., butanediol) as a glycol component constituting a polyester (for example, see Japanese Patent Application Laid-Open No. 2002-97261) have been proposed. However, transfer foils using these polyester films are easily whitened by an organic solvent contained in a printing ink, such as ethyl acetate, methyl ethyl ketone, toluene, acetone and the like and, thus, the transparency and smoothness of the film surface become deteriorated, causing a problem of easy occurrence of printing defects because printability is not considered particularly although formability is good. Accordingly, a film having a solvent resistance to various solvents contained in a printing ink, i.e., a film excellent in printability, has been demanded.

Further, although a non-oriented polyester film has a good formability compared to a biaxially oriented film, the film is sequentially coated with a release film layer, a top layer, and a printing layer when it is used, for example, for forming uses such as transfer foils. Each layer can be sequentially formed by applying a coating solution dissolved in a solvent for the formation of these layers, such as ethyl acetate, methyl ethyl ketone, toluene, acetone and the like or a mixture thereof, and drying the solvent. The temperature to dry the solvent under heating is near the boiling point of each solvent, or at or above the boiling point of each solvent (ethyl acetate (boiling point: 77° C.), methyl ethyl ketone (boiling point: 80° C.), toluene (boiling point: 110° C.), acetone (boiling point: 56° C.)). However, compared to the biaxially oriented film, the non-oriented polyester film is easy to produce a transformation such as wrinkles, elongation, shrinkage and the like when a tension is applied at a drying temperature which is at or above the glass transition temperature because the molecules are not fixed due to such an stretching and thermal treatment, as well as when it is transferred on a molded product, a printed matter is transformed to cause a molding defect, resulting in a problem that the heat resistance to 80 to 120° C. is insufficient.

Moreover, a polyester sheet for molded part obtained by laminating a thermoplastic polyester having a melting point of 180° C. or higher and a crystallization parameter Δ Tcg (crystallization temperature-glass transition temperature) of 50° C. or lower on both sides of another thermoplastic polyester has been proposed (for example, see Japanese Patent No. 3139512). However, heat resistance and solvent resistance of the film are insufficient because the thickness of the multilayer laminate and the crystallinity on the surface of the multilayer laminate have not been considered and, thus, such a film does not satisfy all of the heat resistance, solvent resistance, and formability.

Furthermore, non-oriented polyester films are an amorphous film obtained by rapid cooling to a glass transition temperature or lower, followed by solidification upon cooling. These amorphous films are thermodynamically in the non-equilibrium state, and thermodynamic quantities such as volume and enthalpy in a range of from room temperature to the glass transition temperature are relaxed to cause physical degeneration without chemical changes. It is said that a heterogeneous structure is generated in the amorphous film due to the enthalpy relaxation or volume relaxation, and such a heterogeneous structure as a fault causes embrittlement. On the other hand, because a biaxially oriented film is crystallized or oriented by stretching or heat-set, the molecule is difficult to move and these relaxation phenomena do not occur. The thinner the amorphous film thickness is, the more easily the relaxation phenomenon progresses. The thicker the film thickness is and the longer the length of the molecule is (the larger the intrinsic viscosity of the film is), the more the relaxation phenomenon occurs although its progress is delayed. Specifically, an elongation at break of the film immediately after its production shows a few hundred percent, but the elongation at break after the passage of time is a few percent, and when various processings such as slit formation are performed, break and tear easily occur, leading to bad handling. Accordingly, improvements have been demanded for this embrittlement over time.

Therefore, a film which can satisfy all of flexibility, heat resistance, solvent resistance, printability, formability, and embrittlement resistance over time has been desired.

It could therefore be helpful to provide a multilayer polyester film including a polyester (B) layer mainly composed of a polyester (B) laminated on at least one side of a polyester (A) layer mainly composed of a polyester (A), wherein the flexibility and embrittlement resistance over time of the film are retained by specifying the elastic modulus of the multilayer film in an atmosphere at 23° C. and 120° C., and the heat resistance, solvent resistance, printability, and formability are also retained by defining the thickness of the polyester (B) layer within a specific range as well as defining a face orientation coefficient within a specific range.

SUMMARY

We thus provide:

[1] A multilayer polyester film including a polyester (B) layer mainly composed of a polyester (B) laminated on at least one side of a polyester (A) layer mainly composed of a polyester (A), wherein the multilayer polyester film has an elastic modulus of 20 to 1000 MPa in an atmosphere at 23° C. and an elastic modulus of 10 to 200 MPa in an atmosphere at 120° C., and has substantially no-orientation.

[2] The multilayer polyester film according to the above item [1], wherein the half-width of the spectral band at 1730 cm$^{-1}$ as measured by laser Raman spectroscopy on the surface of the polyester (B) layer is less than 23 cm$^{-1}$.

[3] The multilayer polyester film according to the above item [1] or [2], wherein the polyester (B) layer is laminated on both sides of the polyester (A) layer.

[4] The multilayer polyester film according to any one of the above items [1] to [3], wherein the thickness of the polyester (B) layer is in a range of 20 to 70% of the total thickness of the multilayer polyester film.

[5] The multilayer polyester film according to any one of the above items [1] to [4], wherein the polyester (A) is a copolymerized polyester (A) and the copolymerized polyester (A) satisfies the following items (1) and (2):
(1) containing, as a dicarboxylic acid component, 60 to 95 mol % of an aromatic dicarboxylic acid component and 5 to 40 mol % of an aliphatic dicarboxylic acid component;
(2) containing, as a glycol component, at least one or more glycol components having 10 or less carbon atoms.

[6] The multilayer polyester film according to the above item [5], wherein a dimer content in the aliphatic dicarboxylic acid component is 70 to 90 mass %, and a trimer content in the aliphatic dicarboxylic acid component is 10 to 30 mass %.

[7] The multilayer polyester film according to the above item [5] or [6], wherein the aliphatic dicarboxylic acid component is a dimer acid or a dimer acid derivative.

[8] The multilayer polyester film according to any one of the above items [1] to [7], wherein the polyester (B) is a polyester composed of at least one selected from the group consisting of polypropylene terephthalate, polyethylene naphthalate, polybutylene terephthalate, and a copolymer thereof.

A multilayer polyester film excellent in flexibility, solvent resistance, printability, heat resistance, formability, and embrittlement resistance over time can be obtained. More specifically, since the multilayer polyester film has an excellent solvent resistance against solvents contained in a printing ink, particularly, ethyl acetate, methyl ethyl ketone, toluene, acetone and the like, a variety of printing ink can be used and, thus, its printability is excellent.

In addition, excellent flexibility and embrittlement resistance over time of the multilayer polyester film can be achieved by producing a copolymerized polyester of an aliphatic dicarboxylic acid from the polyester (A) and allowing an elastic modulus of the multilayer film to be within a specific range in an atmosphere at 23° C., and a compatibility between coatability (heat resistance) for drying various solvents and formability of the multilayer film is possible by laminating a specific polyester (B) layer on both sides of the polyester (A) layer in a range of a specific thickness ratio, allowing an elastic modulus of the multilayer film to be within a specific range in an atmosphere at 120° C., and allowing a face orientation coefficient of the film to be within a specific range.

The multilayer polyester film can be used as a film for forming such an in-mold transfer foil for use in printing and forming, and a forming film for Automobile's exterior and interior parts, bathroom panels, parts for home electric appliances, and packing containers, because it shows excellent formability, such as deep-drawability and forming following to the surface shape of a transfer body.

DETAILED DESCRIPTION

In the multilayer polyester film, from the viewpoint of solvent resistance against solvents contained in a printing ink, i.e., printability and heat resistance, it is important to laminate a polyester (B) layer mainly composed of a polyester (B) on at least one side of a polyester (A) layer mainly composed of a polyester (A). The lamination is preferably performed using a film constitution composed of polyester (B) layer/copolymerized polyester (A) layer/polyester (B) layer from the viewpoint of preventing the film from the occurrence of a curl phenomenon due to a different expansion and contraction stress of each layer by the temperature or humidity, and from the viewpoint of handling properties of the film.

In addition, the lamination is performed preferably in such a manner that the thickness of the polyester (B) layer mainly composed of the polyester (B) is in a range of 20 to 70% of the total thickness of the film because its flexibility, heat resistance, and formability are satisfied. Further, the thickness of the polyester (B) layer means the thickness of the polyester (B) layer itself in the case of one layer, and means the total thickness of the existing polyester (B) layers in the case where two or more layers are present. The thickness is preferably in a range of 25 to 67%, more preferably in a range of 30 to 60%. If the thickness of the polyester (B) layer mainly composed of the polyester (B) is less than 20% of the total thickness of the multilayer polyester film, its heat resistance tends to be inferior. To the contrary, if the thickness of the polyester (B) layer mainly composed of the polyester (B) exceeds 70% of the total thickness of the multilayer polyester film, its flexibility and formability be inferior.

An aliphatic dicarboxylic acid copolymerized polyester (A) is preferable as the polyester (A) for use in the polyester (A) layer, in view of its flexibility and embrittlement resistance over time. The aliphatic dicarboxylic acid copolymerized polyester preferably used as the polyester (A) is preferably composed of a hard segment containing mainly an aromatic dicarboxylic acid or the like as the dicarboxylic acid component and a soft segment containing mainly an aliphatic dicarboxylic acid component as the aliphatic dicarboxylic acid component. In the aliphatic dicarboxylic acid copolymerized polyester, examples of the aromatic dicarboxylic acid component constituting the hard segment include, for example, terephthalic acid, isophthalic acid, naphthalenedicarboxylic acid, diphenyldicarboxylic acid, diphenylsulfonedicarboxylic acid, diphenoxyethanedicarboxylic acid, 5-sodium sulfoisophthalic acid, phthalic acid and the like. Among the aromatic dicarboxylic acid components, terephthalic acid, isophthalic acid, and naphthalenedicarboxylic acid are preferable. As for the content of the aromatic dicarboxylic acid component in the whole dicarboxylic acid components of the aliphatic dicarboxylic acid copolymerized polyester is preferably 60 to 95 mol %, more preferably 65 to 93 mol %, and particularly preferably 70 to 90 mol %.

In the aliphatic dicarboxylic acid copolymerized polyester, the aliphatic dicarboxylic acid component which constitutes the soft segment is preferably a derivative derived from an unsaturated aliphatic acid having 10 to 30 carbon atoms, represented by the formula shown below. It can be obtained from a dimerized aliphatic acid (hereinafter abbreviated as a dimer) obtained mainly by dimerizing an unsaturated aliphatic acid or from an ester-forming derivative of the dimer.

wherein R is a hydrogen atom or an alkyl group; m is an integer of 1 to 25; k is an integer of 1 to 5; n is an integer of 0 to 25; and m, k and n satisfy the relation equation of $8 \leq m+3k+n \leq 28$.

In the dimerization reaction of this unsaturated aliphatic acid, a trimerized aliphatic acid (hereinafter abbreviated as a trimer) obtained by trimerization of the unsaturated aliphatic acid is also produced together with the dimer. Therefore, an aliphatic dicarboxylic acid derivative obtained by dimerization reaction of an unsaturated aliphatic acid contains a dimer, a trimerized product, i.e., a trimer, and a monomer remaining unreacted.

When a highly purified aliphatic dicarboxylic acid derivative containing of 95 mass % or more of the dimer, especially 98 mass % or more of the dimer obtained by purifying the aliphatic dicarboxylic acid derivative through plural times of distillation or the like is used, a copolymerized polyester excellent in color tone can be obtained. However, since the distillation process remarkably increases the cost of the aliphatic dicarboxylic acid derivative, it is preferred that the aliphatic dicarboxylic acid derivative contains 70 to 90 mass % of the dimer and 10 to 30 mass % of the trimer, in view of the compatibility between the color tone of the copolymerized polyester and cost. That is, in the aliphatic dicarboxylic acid copolymerized polyester which constitutes the polyester (A) layer, it is preferred that the dimer content of the aliphatic dicarboxylic acid derivative is in a range of 70 to 90 mass % and the trimer content is in a range of 10 to 30 mass %.

Moreover, although unsaturated bonds formed through the dimerization reaction of an unsaturated aliphatic acid exist in the aliphatic dicarboxylic acid derivative used for producing the aliphatic dicarboxylic acid copolymerized polyester which constitutes the polyester (A), the aliphatic dicarboxylic acid derivative containing the unsaturated bonds may be used as it is as a raw material for polymerization, or reduction by hydrogenation may be performed before using the aliphatic dicarboxylic acid derivative as raw material. However, when heat resistance, weather resistance, and transparency are particularly required, it is preferred to use the dimer from which such unsaturated bonds have been removed by hydrogenation.

It is preferred that the dimer of an unsaturated aliphatic acid as the aliphatic dicarboxylic acid derivative that can be used for producing the aliphatic dicarboxylic acid copolymerized polyester constituting the polyester (A) is a dimer acid as a dimer acid with 36 carbon atoms or a dimer acid derivative obtained by esterifying the dimer acid. The dimer acids are those obtained by dimerizing an unsaturated aliphatic acid with 18 carbon atoms, such as linoleic acid and linolenic acid, and include, for example, commercially available "PRIPOL" from Uniqema International or various ester-forming derivatives thereof. One or two or more of the above compounds may be used in combination.

The amount of the dicarboxylic acid component in the aliphatic dicarboxylic acid copolymerized polyester which constitutes the polyester (A) is preferably in a range of 5 to 40 mol %, more preferably in a range of 7 to 35%, and further more preferably in a range of 10 to 30% based on the whole dicarboxylic acid components.

If the amount of the aliphatic dicarboxylic acid component in the aliphatic dicarboxylic acid copolymerized polyester exceeds 40 mol % of the whole dicarboxylic acid components of the aliphatic dicarboxylic acid copolymerized polyester, decline in productivity such as deterioration in cutting property may occur, which is not desirable, although the flexibility is excellent. On the other hand, if the amount of the aliphatic dicarboxylic acid component in the aliphatic dicarboxylic acid copolymerized polyester is less than 5 mol % of the whole dicarboxylic acid components of the aliphatic dicarboxylic acid copolymerized polyester, deterioration in flexibility may occur, which is not desirable. In the case of the aliphatic dicarboxylic acid copolymerized polyester, it is preferred to contain as a glycol component at least one or more glycol components with 1 to 10 carbon atoms. Specific examples of the glycol component with 10 or less carbon atoms include ethylene glycol, 1,3-propanediol, 1,2-propanediol, 2-methyl-1,3-propanediol, 1,3-butanediol, 1,4-butanediol, 1,2-butanediol, 1,5-pentylglycol, 2,2-dimethyl-1,3-propanediol, 2-ethyl-1,3-propanediol, 1,6-hexanediol, 2-methyl-2-ethyl-1,3-propanediol, 1,8-octanediol, 1,10-decanediol, 1,3-cyclobutanediol, 1,3-cyclobutane-dimethanol, 1,3-cyclopentanedimethanol, 1,4-cyclohexanedimethanol and the like. Among them, one or more members selected from ethylene glycol, 1,3-propanediol, and 1,4-butanediol are preferred, and it is further preferable to select 1,4-butanediol as an essential component and to select one or members from ethylene glycol and 1,3-propanediol. The reason why it is preferred to select plural glycol components is because it is possible to control crystallinity by copolymerizing plural glycol components and changing the addition amount, although it is difficult to control its crystallinity in the case where there is only one kind of the glycol component. The ratio of the selected glycol component containing one or more glycol components with 1 to 10 carbon atoms is preferably 80 to 100 mol %, more preferably 90 to 100 mol %, based on the whole glycol components contained in the aliphatic dicarboxylic acid copolymerized polyester which is used preferably as the polyester (A), in view of the formability, crystallinity control, productivity, and cost.

The polyester (A) layer mainly composed of the polyester (A) in the multilayer polyester film is preferably a polyester (A) layer containing 80 mass % or more of the polyester (A) from the viewpoint of retaining its glass transition temperature, flexibility, and embrittlement resistance over time. The content of the polyester (A) is more preferably 90 to 100 mass %, further preferably 95 to 100 mass %.

Specific examples of the polymer used as the polyester (A) include a copolymer of an aliphatic dicarboxylic acid among the dicarboxylic acid components in combination with an aromatic dicarboxylic acid component (e.g., isophthalic acid, terephthalic acid) and a glycol component (e.g., ethylene glycol, 1,3-propanediol, 1,4-butanediol), such as an isophthalic acid-terephthalic acid-dimer acid-ethylene-butylene copolymer, an isophthalic acid-terephthalic acid-dimer acid-butylene copolymer, a terephthalic acid-dimer acid-butylene copolymer or the like.

In addition, a polymer composed of other components may be mixed with the polyester (A) constituting the polyester (A) layer, in an amount within a range such that the effect is not spoiled.

As for the polyester (B) used for the polyester (B) layer of the multilayer polyester film, it is possible to use a dicarboxylic acid component and a glycol component, both of which are similar to the polyester components used for the polyester (A) layer.

The polyester (B) used for the polyester (B) layer of the multilayer polyester film is preferably a polyester having a fast crystallization rate or a polyester having a high glass transition temperature from the viewpoint of the solvent resistance and heat resistance. Examples of the polyester having a fast crystallization rate include polybutylene terephthalate, polypropylene terephthalate, polyhexamethylene terephthalate, and a copolymer thereof. Examples of the polyester having a high glass transition temperature include polyethylene naphthalate and a copolymer thereof. The polyester (B) is preferably a polyester consisting of at least one member selected from these. Among these, polybutylene terephthalate, polypropylene terephthalate and a copolymer thereof are preferable, and polybutylene terephthalate and a copolymer thereof are particularly preferable.

The polyester (B) layer mainly composed of the polyester (B) in the multilayer polyester film is preferably a polyester (B) layer containing the polyester (B) in 80 mass % or more from the viewpoint of the solvent resistance and heat resistance. The content is more preferably 90 to 100 mass % and further more preferably 95 to 100 mass %.

Since the polyester (B) layer mainly composed of the polyester (B) of the multilayer polyester film is easy to control to 23 cm$^{-1}$ or less the half-width of the spectral band at 1730 cm$^{-1}$ as measured by Laser Raman spectroscopy on at least one surface of the polyester (B) layer, it is preferred that a polyester (B) layer contains 80 to 100 mass % of the above polyester (B) composed of at least one member selected from polybutylene terephthalate, polypropylene terephthalate, polyethylene naphthalate and a copolymer thereof. The content is more preferably 90 to 100 mass %, and further more preferably 95 to 100 mass %.

As for the polyester (A) used for the polyester (A) layer and the polyester (B) used for the polyester (B) layer of the multilayer polyester film, the same composition may be used in both polyesters by devising the composition, but it is better to use a desirable composition as mentioned above.

It is important that the multilayer polyester film has an elastic modulus in a range of 20 to 1000 MPa in an atmosphere at 23° C. of the multilayer film from the viewpoint of the flexibility. When the elastic modulus of the film exceeds 1000 MPa, its flexibility is easy to be inferior. To the contrary, if the elastic modulus is less than 20 MPa, the film is so soft that its handling property and heat resistance tend to be inferior. More preferably, the elastic modulus can be in a range of 20 to 800 MPa, particularly preferably in a range of 20 to 600 MPa.

From the viewpoint of making heat resistance and formability compatible, it is important that the multilayer polyester film has an elastic modulus within a range of 10 to 200 MPa in an atmosphere at 120° C. of the multilayer film. If the elastic modulus is less than 10 MPa, the film tends to be a slight draw-stretching, and heat resistance as well as formability is easily deteriorated. To the contrary, if the elastic modulus of the film exceeds 200 MPa, its forming stress is larger, and its formability is easy to be deteriorated. The elastic modulus is more preferably in a range of 10 to 150 MPa, particularly preferably in a range of 10 to 100 MPa. To allow the elastic modulus of the multilayer film to be within a range of 20 to 1000 MPa in an atmosphere at 23° C. and within a range of 10 to 200 MPa in an atmosphere at 120° C. can be achieved by changing the lamination ratio of the polyester (B) layer/polyester (A) layer/polyester (B) layer, and changing the copolymerization amount of the aliphatic dicarboxylic acid component of the polyester (A). Specifically, the elastic modulus can be achieved by forming a film through a high-temperature casting at 40° C. or higher under such conditions that the lamination ratio of the polyester (B) layer/polyester (A) layer/polyester (B) layer is in a range of 1/1/1 to 1/8/1 when polybutylene terephthalate as the polyester (B) component and a copolymerized polyester composed of 17 mol % of dimer acid, 20 mol % of isophthalic acid, 63 mol % of terephthalic acid and 100 mol % of butanediol as the polyester (A) are used.

The multilayer polyester film has preferably a half-width of 23 cm$^{-1}$ or less of the spectral band at 1730 cm$^{-1}$ as measured by Laser Raman spectroscopy on at least one surface of the polyester (B) layer. The spectral band at 1730 cm$^{-1}$ as measured by Laser Raman spectroscopy is said to be assigned to the band of C=O bond of the polyester. It has been found that the smaller the half-width of the spectral band of the C=O bond is, the higher the crystallinity is, and that the solvent resistance and heat resistance is excellent. If the half-width of the spectral band at 1730 cm$^{-1}$ as measured by Laser Raman spectroscopy on at least one surface of the polyester (B) layer exceeds 23 cm$^{-1}$, the solvent resistance and heat resistance tend easily to be deteriorated. The half-width is more preferably 22 cm$^{-1}$ or less and further more preferably 21 cm$^{-1}$ or less. The lower limit of the half-width of the spectral band is 15 cm$^{-1}$ because the lower limit is substantially difficult to be 15 cm$^{-1}$ or less.

It is desirable for the multilayer polyester film to have no-orientation substantially from the viewpoint of the formability. To obtain the substantially non-oriented film, a method for producing a unstreched film is enumerated. Because even in the case of a unstretched film, the film is drafted during film formation and is oriented a little in the machine (longitudinal) direction, it is important to restrain the orientation even in the unstretching case. Since the formability of the width direction may be different from that of the machine (longitudinal) direction at the time of forming when a face orientation coefficient fn exceeds 0.04, a smaller difference of the orientations between the machine (longitudinal) direction and the width direction is desirable. "Substantial non-orientation" means that the face orientation coefficient fn is 0.00 to 0.04.

The face orientation coefficient (fn) is a value calculated by the following equation based on the refractive index (each Nx, Ny, Nz) of a film in the longitudinal direction, width direction, and thickness direction as measured using an Abbe refractometer or the like:

Face orientation coefficient $fn=\{(Nx+Ny)/2\}-Nz$.

When the longitudinal direction and the width direction of the film are not known, the face orientation coefficient (fn) can be determined by regarding a direction having a maximum refractive index in the film face as the longitudinal direction, a direction perpendicular to the longitudinal direction in the film face as the width direction, and a direction perpendicular to the film face as the thickness direction. In addition, the direction of the maximum refractive index in the film face may be determined by measuring the refractive indexes of all directions within the face using an Abbe refractive index meter, or may be determined, for example, by determining a slow axis direction with a retardation measurement apparatus (a birefringence measurement apparatus) or the like.

It is preferable from the viewpoint of the formability, that an elongation at break of the multilayer polyester film is 400% or more in an atmosphere at 120° C. for the multilayer film and a stress at the time of 400% elongation is within a range of 2 to 20 MPa. The formability is required to have a property such as high elongation with a low stress at the forming temperature, as well as not to have a yield point in the stress-strain curve so that a film can extend uniformly. Then, as a result of zealous studies, in the case of deep draw forming, it is preferred that the elongation at break in an atmosphere at 120° C. is 400% or more and the stress at the time of 400% elongation is within a range as low as possible, but if the stress is too low, a draw-stretching state occurs and it is found that the elongation at break of 400% or more can not be obtained. From these points, the stress at the time of 400% elongation is preferably in a range of 2 to 20 MPa, more preferably in a range of 5 to 20 MPa, and further more preferably in a range of 5 to 15 MPa. The elongation at break in an atmosphere at 120° C. is preferably within a range as large as possible, but preferably 1200% or less.

As for the multilayer polyester film, a 5% deflection temperature when applying a load of the stress of the multilayer film of 1.2 MPa to raise the temperature is preferably within a range of 80 to 120° C. For example, each layer such as a release layer, a top coat layer, a print layer, and an adhesion layer is arranged on a film when the film is used as a transfer foil. Various organic solvents are contained in these coating agents, and these organic solvents are dried by heating them near, or at or above the boiling point of each of the organic solvents. At that time, a tension is usually applied so that the surface of the film is uniform. The tension is approximately 4.0 to 1.2 MPa. Transformation such as wrinkles, extension, and shrinkage is easy to occur on the film due to the tension and drying temperature. When the transfer foil is transferred to a molded product, a printed matter is transformed to cause a defective molding easily. A 5% deflection temperature is determined by obtaining a thermo-mechanical analyzer (TMA) curve at the elevated temperature when a load of stress 1.2 MPa is applied with this heat resistance, i.e., coatability, as the maximum tension. Although organic solvents used frequently for various coating agents include ethyl acetate (boiling point: 77° C.), methyl ethyl ketone (boiling point: 80° C.), and acetone (boiling point: 56° C.), the boiling point of methyl ethyl ketone, i.e., 80° C., is set to the lower limit of 5% deflection temperature. As for the upper limit of 5% deflection temperature, the higher the deflection temperature is, the more desirable it is, but if the deflection temperature is too high, the formability tends easily to be inferior, which is undesirable, and thus the upper limit of 5% deflection temperature is set to 120° C. If the 5% deflection temperature is less than 80° C., this is not desirable from the viewpoint of coatability (heat resistance). To the contrary, if the 5% deflection temperature exceeds 120° C., the forming stress is bigger, resulting easily in deterioration of the formability, which is undesirable, although the coatability (heat resistance) is excellent. In addition, compounds (e.g., plasticizers, weather resistant agents, antioxidants, heat stabilizers, lubricants, antistatic agents, brighteners, colorants, conductive agents and the like), and inorganic particles, organic particles, other kinds of polymers and the like may be added to the multilayer polyester film so long as they do not spoil the effect.

It is possible to improve its coatability, printability and the like of the multilayer polyester film by applying a surface treatment such as corona discharge processing or the like. Moreover, various coatings may be applied, and the kind of coating compounds, coating methods, and coating thickness are not particularly limited so long as they do not spoil the effect. Furthermore, the multilayer polyester film can also be used after a forming processing (e.g., emboss processing) and a printing processing, where necessary. The thickness of the whole film may be selected freely depending on its use. The thickness of the film is usually in a range of 20 to 500 μm, and, from the viewpoint of stability in the film formation, the thickness is preferably in a range of 30 to 200 μm and further preferably in a range of 50 to 200 μm. The multilayer polyester film can be obtained by the melt extrusion method such the T-die method or the inflation method. For example, in the case where a film is obtained by the T-die method, important conditions are such that the extruded film is gradually cooled for crystallization and solidified upon cooling.

Then, a method for producing the multilayer polyester film will be explained, but this disclosure is not limited thereto.

A polyester (A) layer mainly composed of a polyester (A) (as mentioned above, an aliphatic dicarboxylic acid copolymerized polyester is preferable as the polyester (A)) and a polyester (B) layer mainly composed of a polyester (B) (as mentioned above, a polyester composed of at least one member selected from polybutylene terephthalate, polypropylene terephthalate, polyethylene naphthalate, and a copolymer thereof is preferable as the polyester (B)) are fed to a known melt extruder after having dried them as needed. The melt extruder may be a single-screw melt extruder or a twin-screw melt extruder with a vent port. The fed polyesters are melted at the respective melting points (+20 to 30° C.) of the polyesters, and then passed through a leaf disk filter with a filtration precision of 20 to 40 μm.

Then, in the case of three-layer lamination, after passing through a three-layer pinole pipe of layer B/layer A/layer B, the polyester is introduced into a slit-shaped T die mold and extruded into a sheet. The extruded sheet is contacted with a casting drum whose surface temperature is adjusted to 40 to 80° C., by an electrostatic application method on both ends of the extruded sheet using a needle-shaped edge pinning apparatus, an air nozzle/air chamber method, a suction chamber method or the like, and solidified upon cooling from the melted state, thereby be able to obtain a multilayer polyester film. The casting drum may be a mirror surface drum or a pearskin finished surface drum, but from the viewpoint of close adherence and adhesiveness of the film to the drum, the pearskin finished surface drum is preferable. From the point of compatibility between adhesiveness and close adherence, the surface roughness of the pearskin finished surface drum is preferably in a range of 100 to 1000 nm, more preferably 200 to 500 nm, of an average center line roughness Ra. When the pearskin finished surface drum is used, the close adherence to the drum tends easily to be insufficient, resulting sometimes in the formation of a film with poor transparency, and thus it is preferred to use a combination with another adherence method. For example, a combination of the electrostatic application method on both ends using a needle-shaped edge pinning apparatus and a full air chamber method is desirable.

As for the resulting film, a substantially nonoriented and unstreched film having a face orientation coefficient fn of 0.00 to 0.04 is obtained. It is desirable to maintain the casting drum temperature within a range of 40 to 80° C. so that the half-width of the spectral band at 1730 $cm^{-1}$ as measured by Laser Raman spectroscopy on at least one surface of the polyester (B) layer is 23 $cm^{-1}$ or less. If the casting drum temperature exceeds 80° C., the half-width of the spectral band at 1730 $cm^{-1}$ as measured by Laser Raman spectroscopy on the polyester (B) layer is 23 $cm^{-1}$ or less, but the film is easily adhered to the casting drum, leading to low productivity. In addition, if the casting drum temperature exceeds 80° C., the film is excellent in heat resistance, but the film whitens to deteriorate the transparency sometimes, and the formability is poor sometimes, which is undesirable. To the contrary, if the casting drum temperature is less than 40° C., the half-width of the spectral band at 1730 $cm^{-1}$ as measured by laser Raman spectroscopy on the polyester (B) layer exceeds 23 $cm^{-1}$, and the heat resistance and solvent resistance of the polyester is inferior, which is undesirable.

A specific example of a production method such that the half-width of the spectral band at 1730 $cm^{-1}$ as measured by Laser Raman spectroscopy on at least one of the polyester (B) layer can be 23 $cm^{-1}$ or less is a method which includes the following three points. If any of the following three points is lacked, it may be difficult to achieve such a half-width: (1) Using the pearskin finished surface drum mentioned above, (2) Maintaining the casting drum temperature at 40 to 80° C., and (3) Using a casting adherence method in combination (an electrostatic application method on both ends using a needle-shaped edge pinning apparatus and a full air chamber method).

The multilayer polyester film is excellent in flexibility, heat resistance, solvent resistance, printability, formability and embrittlement resistance over time, and, in particular as for its formability, a forming into a stereo shape is possible because the film is a non-oriented film, and a deep, excellent designability can be obtained. Accordingly, the multilayer polyester film can be preferably used as a forming film for the surface of complex-shaped parts, such as Auto-mobile's exterior and interior parts, decorative sheets for building materials, bathroom panels, parts for home electric appliances, parts of OA articles, packaging containers and the like.

EXAMPLES

Our films and methods will be explained by way of Examples, but this disclosure is not limited by these Examples. Moreover, various physical properties were measured and evaluated by the following methods.

(1) Composition ratios of monomer, dimer, and trimer in aliphatic dicarboxylic acid (derivative)

An aliphatic dicarboxylic acid (derivative) was analyzed by a high performance liquid chromatography, and the composition ratio was determined from the peak areas of respective components. Known measuring conditions can be used, and an example of the conditions is shown below:

Column: Interstil ODS-3 2.0 mmφ×250 mm
Mobile phase: Aqueous $H_3PO_4$ solution/methanol=80/20–(20 min), 20/80–(40 min)
Flow rate: 0.4 mL/min
Column temperature: 45° C.
Detector: Photodiode array (200 to 400 nm) 21512 used as chromatogram.

When the composition ratio of the monomer, dimer and trimer in an aliphatic dicarboxylic acid (derivative) of a film is determined, the following method can be used. A method including separating each layer of the layers A and B of the film by shaving them off, using a chromatography such as gel permeation chromatography (GPC) or the like or nuclear magnetic resonance (NMR) measurement or the like to identify the aliphatic dicarboxylic acid (derivative), and determining the composition ratio of the monomer, dimer and trimer thereof is considered.

(2) Intrinsic Viscosity of Polyester

A polyester was dissolved in orthochlorophenol, and the intrinsic viscosity was measured at 25° C.

(3) Glass Transition Temperature (Tg), Melting Point (Tm)

Using a differential scanning calorimeter Model DSCII manufactured by Seiko Instruments Inc., the glass transition temperature (Tg) and melting point (Tm) were determined from a DSC curve at a temperature rising rate of 10° C./min for 5 mg of a sample. The peak temperature of an endothermic fusion curve was taken as the melting point (Tm).

(4) Film Thickness, Lamination Thickness of Polyester (B) Layer, and Ratio of Polyester (B) Layer When a total thickness of a film was measured, the thicknesses at five optional positions of each sample cut from the film using a dial gauge were measured and averaged. When the thickness of a multilayer film was measured, a micrograph of each cross section at five optional positions of the film was taken through transmitted light under the conditions of a magnification of 100 times using a metallurgical microscope Leica DMLM manufactured by Leica Microsystems, and then the thickness of each layer of the multilayer film was measured. The ratio of the layer (B) to the thickness of the entire film was determined from each thickness of the measured polyester (B) layer.

(5) Face Orientation Coefficient (fn)

Using a sodium D line (wavelength: 589 nm) as a light source, a refractive index (Nx) in the longitudinal direction, a refractive index (Ny) in the width direction and a refractive index (Nz) in the thickness direction of the film surface were measured by an Abbe refractometer, and then a face orientation coefficient (fn) was calculated from the following equation:

$$\text{Face orientation coefficient } fn=\{(Nx+Ny)/2\}-Nz.$$

(6) Half-Width of Spectral Band at 1730 $cm^{-1}$ Measured by Laser Raman Spectroscopy A polyester film was embedded in an epoxy resin and a cross-section sample was prepared by a microtome, and a Raman spectrum was measured at a measurement point of 1 μm from the film surface using a device and measurement conditions shown below to measure the half-width ($cm^{-1}$) of the Raman band at or around 1730 $cm^{-1}$. Measurements (number of measurements n=5) at different places were performed, and the measured values were averaged to obtain an average value which was served as the half-width of the spectral band.

Device: Ramnor T-64000 (Horiba Jobin Yvon), having microscopic Raman (Raman Microprobe) function
Microprobe
  Beam Splitter: Right
  Object Lens: ×100
  Beam Diameter: 1 μm
  Cross Slit: 200 μm
Source of Light
  Ar+Laser: NEC GLG3460 5145A
  Laser Power: 40 mW
Spectroscope
  Constitution: 640 mm Triple Monochromator
  Diffraction Grating: PAC Holographic 76×76 mm Spectrograph 1800 gr/mm
  Dispersion: Single, 7 A/mm
  Slit: 100 μm
Detector
  CCD: Jobin Yvon 1024×256.

(7) Surface Roughness Ra of Drum Having Pearskin finished Surface

Using a triacetylcellulose film having a thickness of 80 μm (Bioden RFA triacetylcellulose/solvent: ethyl acetate), the triacetylcellulose film was applied on the surface of a drum having a pearskin finished surface by a pressure roller under a line pressure of 9.8 N/cm to transfer the surface shape of the drum, and dried at room temperature to remove the solvent, to give a replica sample, which was served as a measurement sample. The surface side on which the drum surface shape was transferred, in the measurement sample mentioned above, was measured using a meter ET-10 for step height difference of thin films with high precision, manufactured by Kosaka Laboratory Ltd. A center line surface roughness Ra was obtained by the measurement under the conditions of a stylus tip radius of 0.5 μm, a needle pressure of 5 mg, a measurement length of 1 mm, and a cutoff of 0.08 mm. Definitions of each parameter are those shown in "Surface Roughness Evaluation Method (Hyoumen Arasa Hyouka Houhou (in Japanese))" written by Jiro Nara (Comprehensive Technology Center, 1983).

(8) Film-forming Property

Film-forming Property in the film-forming of a multilayer polyester film was evaluated according to the following criteria. If the film-forming is rated as "○" and "Δ", the film is suitable for satisfying our purposes.

○: The discharge quantity was so constant as to enable film forming.
Δ: The discharge quantity was temporarily unstable, but there was little problem in film forming.
x: The discharge quantity was evidently unstable, and stable film forming was difficult.

(9) Solvent Resistance

Ethyl acetate, methyl ethyl ketone, acetone, methyl isobutyl ketone, and toluene were each dropped in a volume of 3 ml on the surface of a film. After standing for 6 hours, the solvent was completely wiped. The surface state was evaluated by visual observation according to the following criteria. Samples are evaluated as a pass level when rated as "○" and "Δ."

○: Whitening, shrinkage, transformation, and trace solvent were not observed for all solvents.

Δ: Relatively low degree of whitening, shrinkage, and transformation was observed for either of solvents.

x: Whitening, shrinkage, and transformation were observed for either of solvents.

(10) Heat Resistance (5% Deflection Temperature)

A measurement for heat resistance was performed using a TMA thermal analysis system EXSTAR6000 (manufactured by Seiko Instruments Inc.) under such conditions that a temperature rising rate is 10° C./min, a measurement temperature range is within 25 to 200° C., a sample length is 20 mm, a sample width is 4 mm, and a load applied is a stress 1.2 MPa. The temperature at 5% elongation of the sample length was determined from the elongation curve by measurements (the number of tests: n=5) in the longitudinal direction and width direction, and an average value in the longitudinal direction and width direction was served as 5% deflection temperature. The heat resistance was evaluated from the 5% deflection temperature obtained according to the following criteria. The samples are regarded as a pass level when rated as "○" and "Δ."

○: The one where the 5% deflection temperature exceeds 100° C.

Δ: The one where the 5% deflection temperature is in a range of 80 to 100° C.

x: The one where the 5% deflection temperature is less than 80° C.

(11) Flexibility (Elastic Modulus in Atmosphere at 23° C.)

A sample measuring 200 mm in length and 10 mm in width was cut out from a film in two directions (i.e., in the longitudinal direction and in the width direction), and the measurements (the number of tests: n=5) for flexibility were performed at a tensile rate of 200 mm/min in an atmosphere at 23° C. in accordance with ASTM-D-882-81 (Method A) to determine an average value of the two directions, respectively. The values obtained were served as an elastic modulus in an atmosphere at 23° C. The flexibility was evaluated from the obtained elastic modulus according to the following evaluation criteria. The samples are regarded as a pass level when rated as "○" and "Δ."

○: The one having an elastic modulus less than 250 MPa in an atmosphere at 23° C.

Δ: The one having an elastic modulus in a range of 250 to 1000 MPa in an atmosphere at 23° C.

x: The one having an elastic modulus exceeding 1000 MPa in an atmosphere at 23° C.

(12) Elastic Modulus in Atmosphere at 120° C.

The elastic modulus in an atmosphere at 120° C. was measured and obtained in a similar manner to the above (11).

(13) Formability

With use of a cup type vacuum forming machine, formability was evaluated under the temperature condition of 120° C. Forming was performed under the condition of a draw ratio of 1.0 using a cup having a diameter of 50 mm, and the state when formed under the best temperature conditions was evaluated according the following criteria. The symbols "○" and "Δ" when rated mean a pass level.

○: A corner was also formed sharply and the thickness was uniform after forming.

Δ: A slight roundness was observed at a corner and the thickness was slightly nonuniform after forming.

x: The thickness was nonuniform after forming, and wrinkles and fractures occurred.

(14) Embrittlement Resistance Over Time

A film immediately after the production and a film which had been aged in an incubator set to 40° C. for one week were measured in a similar manner to the above-mentioned method (11) to obtain the elongation at break before or after the passage of time. From the elongation at break before or after the passage of time, the retention of the elongation at break was determined and the embrittlement resistance over time was evaluated according to the following criteria. The symbols "○" and "Δ" when rated mean a pass level.

Retention (%) of elongation at break=(elongation at break of film at 40° C. after one week/elongation at break of film immediately after its formation)×100

○: The one within a range of 80 to 100% retention of the elongation at break at 40° C. after one week Δ: The one within a range of 50 to 80% retention of the elongation at break at 40° C. after one week x: The one within a range of less than 50% retention of the elongation at break at 40° C. after one week

(15) Coatability and Printability

At first a corona discharge treatment was performed on the film surface to be printed, according to a method of JIS K6782 so that a wettability index was 45 mN/m or more. Then, using a bar coater, a tension of 1.2 MPa was applied to the film to perform the printing. A gravure ink ("HiLamic" (registered trade mark) manufactured by Dainichiseika Color & Chemicals Mfg. Co., Ltd., main solvent: toluene/methyl ethyl ketone/isopropyl alcohol, ink: 723B Yellow) containing a polyurethane-based resin as a main component was printed on the surface of a film (yellow 50% area) and then dried at 80° C. Furthermore, a gravure ink ("HiLamic" manufactured by Dainichiseika Color & Chemicals Mfg. Co., Ltd., main solvent: toluene/methyl ethyl ketone/isopropyl alcohol, ink: 701 R White) containing a polyurethane-based resin as a main component was printed on the surface of the film (white 50% area) and then dried at 80° C. As a printing plate, a 175 line 35 μm solid plate was used. The state of the printed film was visually observed and evaluated according to the following evaluation criteria. The symbols "○" and "Δ" when rated mean a pass level.

○: Printing is very beautiful, and printing defects, wrinkles and turbidity are not observed at all.

Δ: Printing is comparatively satisfactory, although slight turbidity and very slight wrinkles are observed.

x: Printing quality is poor, and printing defects as well as the occurrences of turbidity and wrinkles which exert an adverse influence on printing are observed.

(16) General Evaluation

Based on the evaluation results of film formability, solvent resistance, heat resistance, flexibility, formability, embrittlement resistance over time, and coatability/printability, a judgment of the evaluation was made according to the following criteria. The symbols "○" and "Δ" when rated mean a pass level.

○: When all evaluations of film formability, solvent resistance, heat resistance, flexibility, formability, embrittlement resistance over time, and coatability/printability are rated as "○", the film can be preferably used as a forming film.

Δ: When one or two items of film formability, solvent resistance, heat resistance, flexibility, formability, embrittlement resistance over time, and coatability/printability are rated as "Δ", and other items are rated "◯", the film can endure practical use sufficiently as a forming film.

x: When at least one item of film formability, solvent resistance, heat resistance, flexibility, formability, embrittlement resistance over time, and coatability/printability is rated as "x" or three or more items of them are rated as "Δ", the film cannot endure practical use as a forming film or it is difficult to use it as a forming film.

In the Examples and the Comparative Examples, the following polyesters and particle masters were used.

Polyethylene Terephthalate (PET)

To a mixture of 91.5 parts by mass of dimethyl terephthalate and 58.5 parts by mass of ethylene glycol were added 0.09 part by mass of magnesium acetate and 0.03 part by mass of diantimony trioxide, and then an ester exchange reaction was performed by heating at an elevated temperature using a conventional method. After addition of 0.026 part by mass of trimethyl phosphate to the ester exchange reaction product, the mixture was transferred to a polycondensation reactor. Then, the reaction system was gradually pressure-reduced while heating to an elevated temperature and the polycondensation reaction was performed at 290° C. under reduced pressure of $1.33 \times 10^2$ Pa or less using a conventional method to prepare a polyester having an intrinsic viscosity of 0.65 dl/g. The resulting polymer had a glass transition temperature of 80° C. and a melting point of 257° C.

Polybutylene Terephthalate (PBT)

To a mixture of 77.8 parts by mass of dimethyl terephthalate and 72.2 parts by mass of 1,4-butanediol were added 0.05 part by mass of tetrabutyl titanate and 0.02 part by mass of IRGANOX 1010 (Ciba Specialty Chemicals), and the mixture was heated finally to 210° C. to perform an ester exchange reaction. After completion of the ester exchange reaction, 0.01 part by mass of trimethyl phosphate, 0.07 part by mass of tetrabutyl titanate and 0.03 part by mass of IRGANOX 1010 were added. The mixture was gradually heated to raise the temperature and reduce the pressure, and finally at 245° C. and at $1.33 \times 10^2$ Pa or less, a polycondensation reaction was performed to prepare a polyester having an intrinsic viscosity of 0.89 dl/g. The obtained polymer had a glass transition temperature of 30° C. and a melting point of 224° C.

Polypropylene Terephthalate (PPT)

To a mixture of 84.1 parts by mass of dimethyl terephthalate and 65.9 parts by mass of 1,3-propanediol was added 0.06 part by mass of tetrabutyl titanate, and the mixture was heated finally to raise the temperature to 220° C. to perform an ester exchange reaction. After completion of the ester exchange reaction, 0.05 part by mass of trimethyl phosphate and 0.04 part by mass of tetrabutyl titanate were added. The mixture was gradually heated to raise the temperature and reduce the pressure, and finally at 260° C. and at $1.33 \times 10^2$ Pa or less, a polycondensation reaction was performed to prepare a polyester having an intrinsic viscosity of 0.70 dl/g. The obtained polymer had a glass transition temperature of 50° C. and a melting point of 223° C.

Polyethylene Naphthalate (PEN)

To a mixture of 99.4 parts by mass of dimethyl 2,6-naphthalenedicarboxylate and 50.6 parts by mass of ethylene glycol was added 0.06 part by mass of tetrabutyl titanate, and the mixture was heated finally to raise the temperature to 220° C. to perform an ester exchange reaction. After completion of the ester exchange reaction, 0.05 part by mass of trimethyl phosphate and 0.04 part by mass of tetrabutyl titanate were added. The mixture was gradually heated to raise the temperature and reduce the pressure, and finally at 290° C. and at $1.33 \times 10^2$ Pa or less, a polycondensation reaction was performed to prepare a polyester having an intrinsic viscosity of 0.69 dl/g. The obtained polymer had a glass transition temperature of 124° C. and a melting point of 270° C.

Copolymerized Polyester 1 (PET/I)

75.5 parts by mass of dimethyl terephthalate, 16.0 parts by mass of dimethyl isophthalate, 58.5 parts by mass of ethylene glycol, 0.04 part by mass of tetrabutyl titanate and 0.016 part by mass of IRGANOX 1010FP were supplied, and while the mixture was heated to raise the temperature from 150° C. to 210° C., an ester exchange reaction was performed according to a conventional method. Then, 0.042 part by mass of trimethyl phosphate was added, and 10 minutes later, 0.055 part by mass of tetrabutyl titanate and 0.022 part by mass of IRGANOX 1010FP were added and the mixture was transferred to a polycondensation reactor. The reaction system was gradually pressure-reduced while heating to raise the temperature, and then a polycondensation reaction was performed under a reduced pressure of $1.33 \times 10^2$ Pa or less at 290° C., to prepare a copolymerized polyester 1 containing 17.5 mol % of isophthalic acid and having an intrinsic viscosity of 0.69 dl/g.

Copolymerized Polyester 2

To a mixture of 41.4 parts by mass of dimethyl terephthalate, 13.2 parts by mass of dimethyl isophthalate, and 48.7 parts by mass of 1,4-butanediol were supplied 0.03 part by mass of tetrabutyl titanate and 0.011 part by mass of IRGANOX 1010FP, and while the mixture was heated to raise the temperature from 150° C. to 210° C., an ester exchange reaction was performed according to a conventional method. Then, 0.01 part by mass of trimethyl phosphate was added, and 10 minutes later, 0.066 part by mass of tetrabutyl titanate, 0.025 part by mass of IRGANOX 1010FP, and a mixed slurry of 34.2 parts by mass of a dimer acid (PRIPOL 1025, manufactured by Uniqema)/12.4 parts by mass of 1,4-butanediol heated to 50° C. beforehand were added. After the temperature in the reactor was returned to 210° C., the mixture was stirred for 30 minutes, and then transferred to a polymerization reactor, to perform a polycondensation reaction according to a conventional method. Finally at 240° C. and at $1.33 \times 10^2$ Pa or less, a polycondensation reaction was performed to obtain a copolymerized polyester 2 containing 20 mol % of isophthalic acid and 17 mol % of a dimer acid and having an intrinsic viscosity of 1.02 dl/g.

Copolymerized Polyester 3

In the same manner as in the case of copolymerized polyester 2, except that the content of the dimer acid was changed, a copolymerized polyester 3 containing 20 mol % of isophthalic acid and 13 mol % of a dimer acid was obtained.

Copolymerized Polyester 4

54.7 parts by mass of dimethyl terephthalate, 18.0 parts by mass of ethylene glycol, 20.3 parts by mass of 1,4-butanediol, 0.04 part by mass of tetrabutyl titanate, and 0.016 part by mass of IRGANOX 1010FP were supplied, and while the mixture was heated to raise the temperature from 150° C. to 210° C., an ester exchange reaction was performed according to a conventional method. Then, 0.042 part by mass of trimethyl phosphate was added, and 10 minutes later, 0.055 part by mass of tetrabutyl titanate, 0.022 part by mass of IRGANOX 1010FP and a mixed slurry of 41.8 parts by mass of a dimer acid (PRIPOL 1025, manufactured by Uniqema)/11.4 parts by mass of 1,4-butanediol/3.8 parts by mass of ethylene glycol heated to 50° C. beforehand were added. After the temperature in the reactor was returned to 210° C., the mixture was stirred for 30 minutes, and then transferred to a polymerization reactor, to perform a polycondensation reaction according to a conventional method. Finally at 245° C.

and at 1.33×10² Pa or less, a polycondensation reaction was performed to obtain a copolymerized polyester 4 containing 20 mol % of a dimer acid and having an intrinsic viscosity of 0.85 dl/g.

Copolymerized Polyester 5

In the same manner as in the case of copolymerized polyester 4, except that the kind of the dimer acid was changed to PRIPOL 1025 (manufactured by Uniqema) and its content was also changed, a copolymerized polyester 5 containing 3 mol % of a dimer acid was obtained.

Copolymerized Polyester 6

54.7 parts by mass of dimethyl terephthalate, 48.5 parts by mass of 1,4-butanediol, 0.04 part by mass of tetrabutyl titanate, and 0.016 part by mass of IRGANOX 1010FP were supplied, and while the mixture was heated to raise the temperature from 150° C. to 210° C., an ester exchange reaction was performed according to a conventional method. Then, 0.042 part by mass of trimethyl phosphate was added, and 10 minutes later, 0.055 part by mass of tetrabutyl titanate, 0.022 part by mass of IRGANOX 1010FP, and a mixed slurry of 34.3 parts by mass of a dimer acid (PRIPOL 1025: manufactured by Uniqema)/12.5 parts by mass of 1,4-butanediol heated to 50° C. beforehand were added. After the temperature in the reactor was returned to 210° C., the mixture was stirred for 30 minutes, and transferred to a polymerization reactor, to perform a polycondensation reaction according to a conventional method. Finally at 245° C. and at 1.33×10² Pa or less, a polycondensation reaction was performed to obtain a copolymerized polyester 6 containing 17 mol % of a dimer acid and having an intrinsic viscosity of 0.92 dl/g.

Copolymerized Polyester 7

In the same manner as in the case of copolymerized polyester 6, except that the content of the dimer acid was changed, a copolymerized polyester 7 containing 25 mol % of a dimer acid was obtained.

Copolymerized Polyester 8

51.4 parts by mass of dimethyl terephthalate, 7 parts by mass of dimethyl isophthalate, 41.7 parts by mass of 1,3-propanediol, 0.04 part by mass of tetrabutyl titanate, and 0.016 part by mass of IRGANOX 1010FP were supplied, and while the mixture was heated to raise the temperature from 150° C. to 210° C., an ester exchange reaction was performed according to a conventional method. Then, 0.042 part by mass of trimethyl phosphate was added, and 10 minutes later, 0.055 part by mass of tetrabutyl titanate, 0.022 part by mass of IRGANOX 1010FP, and a mixed slurry of 36.6 parts by mass of a dimer acid (PRIPOL 1025: manufactured by Uniqema)/13.3 parts by mass of 1,3-propanediol heated to 50° C. beforehand were added. After the temperature in the reactor was returned to 210° C., the mixture was stirred for 30 minutes, and transferred to a polymerization reactor, to perform a polycondensation reaction according to a conventional method. Finally at 245° C. and at 1.33×10² Pa or less, a polycondensation reaction was performed to obtain a copolymerized polyester 8 containing 20 mol % of dimethyl isophthalate and 17 mol % of a dimer acid, and having an intrinsic viscosity of 0.75 dl/g.

Particle Master 1 (MS-1)

A mixture of 90 parts by mass of PET obtained above and 10 parts by mass of silicon dioxide ("Silysia 445," average particle size 2.5 µm, manufactured by Fuji Silysia Chemical Ltd.) was kneaded at 260° C. using a vented counter-rotation twin-axis extruder (L/D=35) with 30 mmφ, to prepare a PET master (MS-1) containing 10% by mass of silicon dioxide.

Particle Master 2 (MS-2)

A mixture of 90 parts by mass of PET obtained above and 10 parts by mass of silicon dioxide ("Silysia 445," average particle size 2.5 µm, manufactured by Fuji Silysia Chemical Ltd.) was kneaded at 260° C. using a vented counter-rotation twin-axis extruder (L/D=35) with 30 mmφ, to prepare a PBT master (MS-2) containing 10% by mass of silicon dioxide.

Particle Master 3 (MS-2)

A mixture of 90 parts by mass of PET obtained above and 10 parts by mass of silicon dioxide ("Silysia 445," average particle size 2.5 µm, manufactured by Fuji Silysia Chemical Ltd.) was kneaded at 260° C. using a vented counter-rotation twin-axis extruder (L/D=35) with 30 mmφ, to prepare a PPT master (MS-4) containing 10% by mass of silicon dioxide.

Particle Master 4 (MS-4)

A mixture of 90 parts by mass of PET obtained above and 10 parts by mass of silicon dioxide ("Silysia 445," average particle size 2.5 µm, manufactured by Fuji Silysia Chemical Ltd.) was kneaded at 300° C. using a vented counter-rotation twin-axis extruder (L/D=35) with 30 mmφ, to prepare a PEN master (MS-4) containing 10% by mass of silicon dioxide.

Drying Conditions of Raw Materials

The copolymerized polyesters 2 to 8 were dried under a reduced pressure at 130° C. for 6 hours, and other copolymerized polyesters, polyesters, and particle masters were dried under a reduced pressure at 180° C. for 4 hours, and then they were used in the following Examples and Comparative Examples.

Example 1

A pellet (100% by mass) of the copolymerized polyester 2 as the polyester (A) of the polyester (A) layer was supplied into a vented counter-rotation twin-screw extruder A (two vents, L/D=70) set at an extrusion temperature of 230° C., and a mixture of a pellet of PBT (98% by mass) and a pellet of the particle master MS-2 (2% by mass) as the polyester (B) of the polyester (B) layer was supplied into a vented counter-rotation twin-screw extruder B (two vents, L/D=70) set at an extrusion temperature of 260° C. They were passed through a three-layer pinole of layer B/layer A/layer B, introduced into a T die with a slit clearance of 0.8 mm set at 260° C. and extruded as a film, and an electrostatic application using a needle-shaped edge pinning device in combination with an air chamber method was performed on both ends of the extruded sheet, and then the sheet was solidified upon cooling by closely contacting with a pearskin finished casting drum (center line surface roughness Ra=200 to 350 nm) with a surface temperature of 60° C., thereby to prepare a polyester film with a thickness of 40 µm (layer B/layer A/layer B thickness=10 µm/20 µm/10 µm). The face orientation coefficient (fn) of the film was 0.00. The polyester film could be stably formed without the occurrence of curls and was excellent in handling properties. In addition, when the film was made as a protective film for forming, its flexibility, solvent resistance, heat resistance, formability, and embrittlement resistance over time were excellent, and it was a superior film as a forming film.

Example 2

A multilayer polyester film with a thickness of 50 µm (layer B/layer A/layer B thickness=10 µm/30 µm/10 µm) was prepared in the same manner as in Example 1, except that a pellet (100% by mass) of the copolymerized polyester 6 was used as the polyester (A) of the polyester (A) layer.

Example 3

A multilayer polyester film with a thickness of 25 µm (layer B/layer A/layer B thickness=5 µm/15 µm/5 µm) was prepared in the same manner as in Example 1, except that a pellet (100% by mass) of the copolymerized polyester 3 was used as the polyester (A) of the polyester (A) layer.

Example 4

A multilayer polyester film with a thickness of 60 μm (layer B/layer A/layer B thickness=10 μm/40 μm/10 μm) was prepared in the same manner as in Example 1, except that a pellet (100% by mass) of the copolymerized polyester 7 was used as the polyester (A) of the polyester (A) layer.

Example 5

A multilayer polyester film with a thickness of 105 μm (layer B/layer A/layer B thickness=50 μm/5 μm/50 μm) was prepared in the same manner as in Example 1, except that a pellet (100% by mass) of the copolymerized polyester 8 was used as the polyester (A) of the polyester (A) layer, and a mixture of a pellet (98% by mass) of PPT and a pellet (2% by mass) of the particle master MS-3 was used as the polyester (B) of the polyester (B) layer.

Example 6

A multilayer polyester film with a thickness of 32 μm (layer B/layer A/layer B thickness=4 μm/24 μm/4 μm) was prepared in the same manner as in Example 1, except that a pellet (100% by mass) of the copolymerized polyester 4 was used as the polyester (A) of the polyester (A) layer, and a mixture of a pellet (98% by mass) of PEN and a pellet (2% by mass) of the particle master MS-4 was used as the polyester (B) of the polyester (B) layer.

Example 7

A multilayer polyester film with a thickness of 60 μm (layer B/layer A thickness=30 μm/30 μm) was prepared in the same manner as in Example 1, except that a two-layer pinole of layer B/layer A was used.

Comparative Example 1

A pellet (100% by mass) of PET as the polyester (A) of the polyester (A) layer was supplied into a single-screw extruder A set at an extrusion temperature of 280° C., and a mixture of a pellet (98% by mass) of PET and a pellet (2% by mass) of the particle PET master MS-1 as the polyester (B) of the polyester (B) layer was supplied into a single-screw extruder B set at an extrusion temperature of 280° C. They were passed through a three-layer pinole of layer B/layer A/layer B, introduced into a T die with a slit clearance of 0.8 mm set at 280° C. and extruded as a film, and the film was solidified upon cooling by wiring it around a mirror surface-finished metallic drum which was kept at 25° C. while performing an electrostatic application, to obtain an unstretched film. Then, the film was drawn to 3.2 times in the longitudinal direction at 90° C. and 3.2 times in the width direction at 115° C., and heat-set at 230° C. to prepare a biaxially drawn multilayer polyester film having a thickness of 25 μm.

Comparative Example 2

A monolayer polyester film with a thickness of 25 μm was prepared in the same manner as in Example 1, except that a pellet (100% by mass) of PET was used as the polyester (A) of the polyester (A) layer, and a mixture of a pellet (98% by mass) of PET and a pellet (2% by mass) of the particle master MS-1 was used as the polyester (B) of the polyester (B) layer.

Comparative Example 3

A monolayer polyester film with a thickness of 25 μm was prepared in the same manner as in Example 1, except that a pellet (100% by mass) of PET was used as the polyester (A) of the polyester (A) layer, and a mixture of a pellet (98% by mass) of PET and a pellet (2% by mass) of the particle master MS-2 was used as the polyester (B) of the polyester (B) layer.

Comparative Example 4

A multilayer polyester film with a thickness of 30 μm (layer B/layer A/layer B thickness=5 μm/20 μm/5 μm) was prepared in the same manner as in Example 1, except that a pellet (100% by mass) of the copolymerized polyester 1 was used as the polyester (A) of the polyester (A) layer, and a mixture of a pellet (98% by mass) of PBT and a pellet (2% by mass) of the particle master MS-2 was used as the polyester (B) of the polyester (B) layer.

Comparative Example 5

A multilayer polyester film with a thickness of 44 μm (layer B/layer A/layer B thickness=2 μm/40 μm/2 μm) was prepared in the same manner as in Example 1, except that a pellet (100% by mass) of the copolymerized polyester 2 was used as the polyester (A) of the polyester (A) layer, and a mixture of a pellet (98% by mass) of PBT and a pellet (2% by mass) of the particle master MS-2 was used as the polyester (B) of the polyester (B) layer, and that the temperature of the pearskin-finished casting drum was set to 25° C.

Comparative Example 6

A multilayer polyester film with a thickness of 40 μm (layer B/layer A/layer B thickness=10 μm/20 μm/10 μm) was prepared in the same manner as in Example 1, except that a pellet (100% by mass) of the copolymerized polyester 5 was used as the polyester (A) of the polyester (A) layer, and a mixture of a pellet (98% by mass) of PBT and a pellet (2% by mass) of the particle master MS-2 was used as the polyester (B) of the polyester (B) layer.

Comparative Example 7

A monolayer polyester film with a thickness of 40 μm was prepared in the same manner as in Example 1, except that a pellet (100% by mass) of the copolymerized polyester 2 was used as the polyester (A) of the polyester (A) layer, and a pellet (100% by mass) of the copolymerized polyester 2 was used as the polyester (B) of the polyester (B) layer. Compositions of the polyesters used in the above Examples and Comparative Examples, as well as evaluation results on the film properties are summarized in Tables 1, 2, and 3, respectively.

TABLE 1

| Polyester | Aliphatic acid or derivative thereof Composition ratio (mass %) | | | Repeating unit constituting copolymerized polyester | | | | Glass transition temperature Tg (° C.) | Melting point Tm (° C.) |
|---|---|---|---|---|---|---|---|---|---|
| | | | | Dicarboxylic acid component | | Glycol component | | | |
| | Monomer | Dimer | Trimer | Kind | Composition ratio (mol %) | Kind | Composition ratio (mol %) | | |
| PET | — | — | — | DMT | 100 | EG | 100 | 80 | 257 |
| PBT | — | — | — | DMT | 100 | BG | 100 | 30 | 224 |
| PPT | — | — | — | DMT | 100 | PG | 100 | 50 | 223 |
| PEN | — | — | — | NDC | 100 | EG | 100 | 124 | 270 |
| Copolymerized polyester 1 | — | — | — | DMT DMI | 82.5 17.5 | EG | 100 | 75 | 223 |
| Copolymerized polyester 2 | 2.2 | 78.6 | 19.2 | DMT DMI DA | 63 20 17 | BG | 100 | −20 | 150 |
| Copolymerized polyester 3 | 2.2 | 78.6 | 19.2 | DMT DMI DA | 67 20 13 | BG | 100 | −17 | 160 |
| Copolymerized polyester 4 | 2.2 | 78.6 | 19.2 | DMT DA | 80 20 | EG BG | 40 60 | −15 | 161 |
| Copolymerized polyester 5 | 0.1 | 98.5 | 1.4 | DMT DA | 97 3 | BG | 100 | 56 | 202 |
| Copolymerized polyester 6 | 2.2 | 78.6 | 19.2 | DMT DA | 83 17 | BG | 100 | −10 | 190 |
| Copolymerized polyester 7 | 2.2 | 78.6 | 19.2 | DMT DA | 75 25 | BG | 100 | −15 | 170 |
| Copolymerized polyester 8 | 2.2 | 78.6 | 19.2 | DMT DMI DA | 63 20 17 | PG | 100 | −5 | 155 |
| Particle MS-1 PET | — | — | — | DMT | 100 | EG | 100 | 80 | 257 |
| Particle MS-2 PBT | — | — | — | DMT | 100 | BG | 100 | 30 | 228 |
| Particle MS-3 PPT | — | — | — | DMT | 100 | PG | 100 | 50 | 223 |
| Particle MS-4 PEN | — | — | — | NDC | 100 | EG | 100 | 124 | 270 |

TABLE 2

| | | Example 1 | Example 2 | Example 3 | Example 4 | Example 5 | Example 6 | Example 7 |
|---|---|---|---|---|---|---|---|---|
| Polyester A layer | Composition | Copolymerized polyester 2 | Copolymerized polyester 6 | Copolymerized polyester 3 | Copolymerized polyester 7 | Copolymerized polyester 8 | Copolymerized polyester 4 | Copolymerized polyester 2 |
| | Melting point Tm (° C.) | 150 | 190 | 160 | 170 | 155 | 161 | 150 |
| | Glass transition temperature Tg (° C.) | −20 | −10 | −17 | −15 | −5 | −15 | −20 |
| | Intrinsic viscosity IV (dl/g) | 1.02 | 0.92 | 0.90 | 0.86 | 0.75 | 0.85 | 1.02 |
| Polyester B layer | Composition (mass %) | PBT (98) MS-2 (2) | PBT (98) MS-2 (2) | PBT (98) MS-2 (2) | PBT (98) MS-2 (2) | PPT (98) MS-3 (2) | PEN (98) MS-4 (2) | PBT (98) MS-2 (2) |
| | Melting point Tm (° C.) | 224 | 224 | 224 | 224 | 223 | 270 | 224 |
| | Glass transition temperature Tg (° C.) | 30 | 30 | 30 | 30 | 50 | 124 | 30 |
| | Intrinsic viscosity IV (dl/g) | 0.89 | 0.89 | 0.89 | 0.89 | 0.70 | 0.69 | 0.89 |
| Film Properties | Thickness (mm) | 40 | 50 | 25 | 60 | 105 | 32 | 60 |
| | Laminate constitution | B/A/B | B/A/B | B/A/B | B/A/B | B/A/B | B/A/B | B/A |

TABLE 2-continued

|  | | Example 1 | Example 2 | Example 3 | Example 4 | Example 5 | Example 6 | Example 7 |
|---|---|---|---|---|---|---|---|---|
| | Lamination ratio | 1/2/1 | 1/3/1 | 1/3/1 | 1/4/1 | 20/1/20 | 1/6/1 | 1/1 |
| | Ratio (%) of total thickness of polyester (B) layer | 50 | 40 | 40 | 33.3 | 95.2 | 25 | 50 |
| | Face orientation coefficient fn (—) | 0.00 | 0.00 | 0.00 | 0.00 | 0.00 | 0.00 | 0.00 |
| | Elastic modulus (MPa) at 23° C. | 130 | 250 | 110 | 140 | 600 | 160 | 130 |
| | Elastic modulus (MPa) at 120° C. | 45 | 42 | 34 | 35 | 160 | 23 | 40 |
| | Half-width ($cm^{-1}$) of spectral band of layer (B) | 20.3 | 20.2 | 20.3 | 19.8 | 20.3 | 20.5 | 20.3 |
| | Film formability | ○ | ○ | ○ | ○ | ○ | ○ | Δ |
| | Solvent resistance | ○ | ○ | ○ | ○ | ○ | ○ | ○ |
| | Heat resistance | ○ | ○ | ○ | ○ | ○ | ○ | Δ |
| | Formability | ○ | ○ | ○ | ○ | Δ | ○ | ○ |
| | Embrittlement resistance over time | ○ | ○ | ○ | ○ | ○ | ○ | ○ |
| | Coatability/Printability | ○ | ○ | ○ | ○ | ○ | ○ | ○ |
| | General evaluation | ○ | ○ | ○ | ○ | ○ | ○ | ○ |

TABLE 3

| | | Comparative example 1 | Comparative example 2 | Comparative example 3 | Comparative example 4 | Comparative example 5 | Comparative example 6 | Comparative example 7 |
|---|---|---|---|---|---|---|---|---|
| Polyester A layer | Composition | PET | PET | PBT | Copolymerized polyester 1 | Copolymerized polyester 2 | Copolymerized polyester 5 | Copolymerized polyester 2 |
| | Melting point Tm (° C.) | 257 | 257 | 224 | 223 | 150 | 202 | 150 |
| | Glass transition temperature Tg (° C.) | 80 | 80 | 30 | 75 | −20 | 56 | −20 |
| | Intrinsic viscosity IV (dl/g) | 0.65 | 0.65 | 0.89 | 0.69 | 1.02 | 0.69 | 1.02 |
| Polyester B layer | Composition | PET (98) MS-1 (2) | PET (98) MS-1 (2) | PBT (98) MS-2 (2) | PBT (98) MS-2 (2) | PBT (98) MS-2 (2) | PBT (98) MS-2 (2) | Copolymerized polyester 2 — |
| | Melting point Tm (° C.) | 257 | 257 | 224 | 224 | 224 | 224 | 150 |
| | Glass transition temperature Tg (° C.) | 80 | 80 | 30 | 30 | 30 | 30 | −20 |
| | Intrinsic viscosity IV (dl/g) | 0.65 | 0.65 | 0.89 | 0.89 | 0.89 | 0.89 | 1.02 |
| Film Properties | Thickness (mm) | 25 | 25 | 25 | 30 | 44 | 40 | 40 |
| | Laminate constitution | Monolayer | Monolayer film | Monolayer film | B/A/B | B/A/B | B/A/B | Monolayer |

TABLE 3-continued

|  | Comparative example 1 | Comparative example 2 | Comparative example 3 | Comparative example 4 | Comparative example 5 | Comparative example 6 | Comparative example 7 |
|---|---|---|---|---|---|---|---|
|  | film |  |  |  |  |  | film |
| Lamination ratio | — | — | — | 1/4/1 | 1/20/1 | 1/2/1 | — |
| Ratio (%) of total thickness of polyester (B) layer | — | — | — | 33.3 | 9.1 | 50 | — |
| Face orientation coefficient fn(—) | 0.17 | 0.00 | 0.00 | 0.00 | 0.00 | 0.00 | 0.00 |
| Elastic modulus (MPa) at 23° C. | 4,000 | 1,500 | 1,280 | 1,200 | 19 | 1,080 | 40 |
| Elastic modulus (MPa) at 120° C. | 1020 | 220 | 250 | 180 | 9 | 150 | 12 |
| Half-width (cm$^{-1}$) of spectral band of layer (B) | 26.0 | 25.7 | 20.2 | 20.3 | 23.6 | 19.9 | 25.8 |
| Film formability | ○ | ○ | ○ | ○ | ○ | ○ | X |
| Solvent resistance | Δ | X | ○ | ○ | ○ | ○ | X |
| Heat resistance | ○ | X | ○ | ○ | X | ○ | X |
| Formability | X | ○ | X | ○ | Δ | ○ | X |
| Embrittlement resistance over time | ○ | X | Δ | X | ○ | X | ○ |
| Coatability/ Printability | Δ | X | ○ | ○ | X | ○ | X |
| General evaluation | X | X | X | X | X | X | X |

The abbreviations used in the above Tables 1, 2, and 3 are as follows:
PET: Polyethylene terephthalate
PBT: Polybutylene terephthalate
PPT: Polypropylene terephthalate
PEN: Polyethylene naphthalate
PET/I: Isophthalic acid copolymerized polyethylene terephthalate
DMT: Dimethyl terephthalate
DMI: Dimethyl isophthalate
DA: Dimer acid
NDC: Naphthalenedicarboxylic acid
EG: Ethylene glycol
BG: 1,4-butanediol
PG: 1,3-propanediol.

The multilayer polyester films obtained in Example 1, Example 3, Example 4, and Example 6 were each excellent in film formability, solvent resistance, heat resistance, flexibility, formability, and embrittlement resistance over time, and thus they were each a superior forming film. The multilayer polyester film obtained in Example 2 was a film excellent in solvent resistance, heat resistance, formability, and embrittlement resistance over time, although it was inferior a little in flexibility, but the flexibility had no problem in practical use. The multilayer polyester film obtained in Example 5 was a film excellent in solvent resistance, heat resistance, and embrittlement resistance over time, although it was inferior a little in flexibility and formability, but the flexibility and formability had no problem in practical use. When the multiple layer polyester film was used as a protective film for forming, it showed an especially excellent effect. On the other hand, the films obtained in Comparative Examples 1 to 5 were inferior in either of film formability, solvent resistance, heat resistance, flexibility, formability, and embrittlement resistance over time, and they were not satisfactory as a protective film for forming.

INDUSTRIAL APPLICABILITY

The multilayer polyester film is excellent in flexibility, solvent resistance, printability, heat resistance, formability and embrittlement resistance over time. More specifically, as for the solvent resistance and printability, a variety of printing ink can be used because the multilayer polyester film has an excellent solvent resistance against solvents contained in a printing ink, particularly such as ethyl acetate, methyl ethyl ketone, toluene, acetone and the like. Moreover, it is possible to combine a coatability (heat resistance) for drying various solvents and a formability by laminating a specific polymer and specifying the ratio of the thickness of the laminate. The multilayer polyester film can be used preferably as an in-mold transfer foil for use in printing and molding, and further as a transfer foil for carrying out a transfer processing in printing for Automobile's exterior and interior parts, bathroom panels, parts for home electric appliances, packing containers and the like because it shows excellent formability, such as deep-drawability and forming following to the surface shape of a transfer body.

The invention claimed is:

1. A multilayer polyester film comprising a polyester (B) layer mainly composed of a polyester (B) laminated on at least one side of a polyester (A) layer mainly composed of a polyester (A), wherein the multilayer polyester film has an elastic modulus of 20 to 1000 MPa in an atmosphere at 23° C., an elastic modulus of 10 to 200 MPa in an atmosphere at 120° C., and has substantially no-orientation, and the half-width of the spectral band 1730 $cm^{-1}$ as measured by laser Raman spectroscopy on the surface of the polyester (B) layer is less than 23 $cm^{-1}$.

2. The multilayer polyester film according to claim 1, wherein the polyester (B) layer is laminated on both sides of the polyester (A) layer.

3. The multilayer polyester film according to claim 1, wherein the thickness of the polyester (B) layer is in a range of 20 to 70% of the total thickness of the multilayer polyester film.

4. The multilayer polyester film according to claim 1, wherein the polyester (A) is a copolymerized polyester (A) and the copolymerized polyester (A) satisfies the following items (1) and (2):
   (1) containing, as a dicarboxylic acid component, 60 to 95 mol % of an aromatic dicarboxylic acid component and 5 to 40 mol % of an aliphatic dicarboxylic acid component;
   (2) containing, as a glycol component, at least one or more glycol components having 10 or less carbon atoms.

5. The multilayer polyester film according to claim 4, wherein a dimer content in the aliphatic dicarboxylic acid component is 70 to 90 mass %, and a trimer content in the aliphatic dicarboxylic acid component is 10 to 30 mass %.

6. The multilayer polyester film according to claim 4, wherein the aliphatic dicarboxylic acid component is a dimer acid or a dimer acid derivative.

7. The multilayer polyester film according to claim 1, wherein the polyester (B) is a polyester composed of at least one selected from the group consisting of polypropylene terephthalate, polyethylene naphthalate, polybutylene terephthalate, and a copolymer thereof.

8. The multilayer polyester film according to claim 2, wherein the thickness of the polyester (B) layer is in a range of 20 to 70% of the total thickness of the multilayer polyester film.

9. The multilayer polyester film according to claim 3, wherein the polyester (A) is a copolymerized polyester (A) and the copolymerized polyester (A) satisfies the following items (1) and (2):
   (1) containing, as a dicarboxylic acid component, 60 to 95 mol % of an aromatic dicarboxylic acid component and 5 to 40 mol % of an aliphatic dicarboxylic acid component;
   (2) containing, as a glycol component, at least one or more glycol components having 10 or less carbon atoms.

10. The multilayer polyester film according to claim 3, wherein the polyester (A) is a copolymerized polyester (A) and the copolymerized polyester (A) satisfies the following items (1) and (2):
    (1) containing, as a dicarboxylic acid component, 60 to 95 mol % of an aromatic dicarboxylic acid component and 5 to 40 mol % of an aliphatic dicarboxylic acid component;
    (2) containing, as a glycol component, at least one or more glycol components having 10 or less carbon atoms.

11. The multilayer polyester film according to claim 5, wherein the aliphatic dicarboxylic acid component is a dimer acid or a dimer acid derivative.

12. The multilayer polyester film according to claim 2, wherein the polyester (B) is a polyester composed of at least one selected from the group consisting of polypropylene terephthalate, polyethylene naphthalate, polybutylene terephthalate, and a copolymer thereof.

13. The multilayer polyester film according to claim 3, wherein the polyester (B) is a polyester composed of at least one selected from the group consisting of polypropylene terephthalate, polyethylene naphthalate, polybutylene terephthalate, and a copolymer thereof.

14. The multilayer polyester film according to claim 4, wherein the polyester (B) is a polyester composed of at least one selected from the group consisting of polypropylene terephthalate, polyethylene naphthalate, polybutylene terephthalate, and a copolymer thereof.

15. The multilayer polyester film according to claim 5, wherein the polyester (B) is a polyester composed of at least one selected from the group consisting of polypropylene terephthalate, polyethylene naphthalate, polybutylene terephthalate, and a copolymer thereof.

\* \* \* \* \*